Sept. 26, 1950  G. CAPELLAZZI  2,524,006

BANKING SPACER FOR UNIVERSAL CHUCKS

Filed Oct. 4, 1944

INVENTOR.
Gildo Capellazzi
BY
*[signature]*
ATTORNEY.

Patented Sept. 26, 1950

2,524,006

UNITED STATES PATENT OFFICE 2,524,006

BANKING SPACER FOR UNIVERSAL CHUCKS

Gildo Capellazzi, New York, N. Y.

Application October 4, 1944, Serial No. 557,168

3 Claims. (Cl. 279—110)

This invention relates to new and useful improvements in banking spacers for universal chucks.

More specifically, the invention proposes the construction of banking spacers adapted to be used in combination with a universal chuck having a flat face across which the jaws of the chuck move. The banking spacers are removably mounted on the flat face to be engaged by the face of a piece of work gripped by the jaws to maintain the piece of work flat and prevent it from being flexed inwards under the pressure applied through the tools being used to work thereon.

Still further the banking spacers are mounted upon the chucks in a manner to be used in combination with disc-like work being gripped by the jaws and which has a normal tendency to flex inwards and be distorted out of a natural plane under the pressure of working tools being used thereon.

A further object of the invention proposes forming the banking spacers in different shapes and of a length slightly longer than the depth of the particular step of the gripping jaws gripping the work in a manner to retain the work to be gripped merely by its peripheral edge.

A further object of the invention proposes a novel means for permitting the length of the banking spacers to be adjusted to meet the requirements of a particular job being gripped by the chuck.

A further object of the invention proposes the provision of a means whereby the banking spacers are formed of telescopic engaged sections with a means for fixedly holding the sections in various adjusted positions to adjust the operative length thereof.

It is a further object of the invention to construct banking spacers for universal chucks which are simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
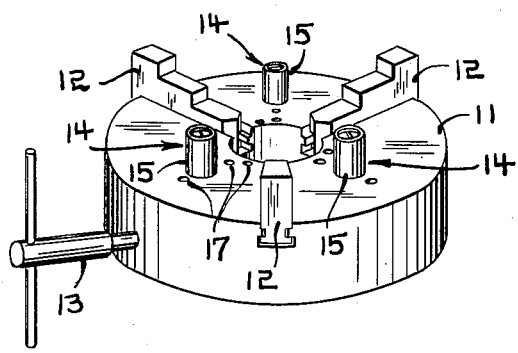
Fig. 1 is a perspective view of a universal chuck provided with banking spacers constructed in accordance with this invention.
Figure 3:
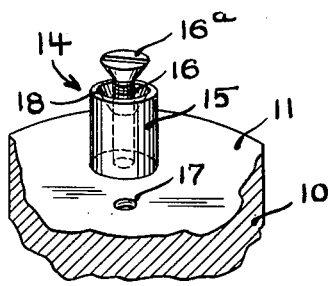
Fig. 3 is a perspective developed view of one of the banking spacers per se.

The banking spacer for universal chucks, according to this invention, is adapted to be used in combination with universal chucks 10 having a flat face 11 across which the gripping jaws 12 of the chuck are adapted to move. The operative position of the jaws 12 are adapted to be adjusted by a removable turning tool 13. However, further details of the chuck will not be given in this specification as such chucks are generally known in the art and the details of the operating mechanism are known by those skilled by the art.

A plurality of banking spacers 14 are removably mounted on the flat face 11 of the chuck 10 and positioned between the jaws 12. Each of the banking spacers 14 comprises a tube 15 adapted to be engaged in position removably upon the face 11 by means of a screw 16. The screw 16 passes freely through the tube 15 and threadedly engages complementary openings 17 formed in the face 11. There is a plurality of openings 17 arranged radially of the face 11 permitting the position of the tubes 15 to be adjusted on the face 11 to correspond with diameter of the work engaged in the chuck. The screws 16 have beveled heads 16ª which are adapted to seat in complementary beveled recess 18 provided on the top of the tube 15.

Figure 2:
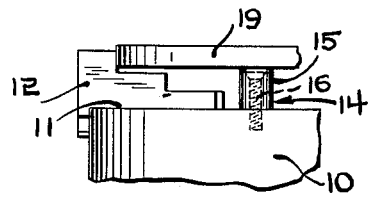
Fig. 2 is a side elevational view of a portion of Fig. 1 with a piece of work for position in the chuck.
Figure 4:
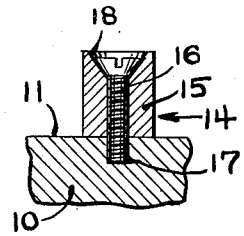
Fig. 4 is an enlarged vertical sectional view through one of the banking spacers.

As shown in Fig. 2 the work 19 is gripped at its peripheral edge by the jaws 12 and rests upon the banking spacer 14. The banking spacer 14 is of a length slightly greater than the particular steps of the gripping jaws 12 which engage the peripheral edge of the work 19 so as to support the work in a slightly raised position off the step. These banking spacers are designed to be used primarily when supporting disc-like work in the chuck 10 so as to prevent the work from being flexed inwards under the pressure of working tools being used thereon.

Figure 5:
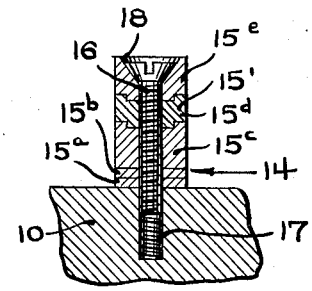
Fig. 5 is a view similar to Fig. 4 but illustrating a modification of the invention.

In the modification of the invention disclosed in Fig. 5 the tube 15' is formed of several sections 15a, 15b, 15c, 15d, and 15e. The sections 15a and 15b merely comprise disc-like washers engaged upon the bottom of the tube, while the sections 15c, 15d, and 15e have inter-engaging portions for assisting and stacking these sections.

Forming tube 15' of separate sections permits the operative length to be varied by the insertion and removal of certain of the sections.

In other respects this form of the invention is similar to that previously shown and like reference numerals identify like parts in each of the several views.

Figure 6:
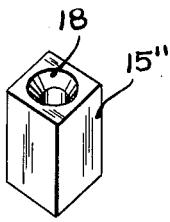
Fig. 6 is a perspective view of a banking spacer constructed in accordance with a still further modification of the invention.

In the modification of the invention shown in Fig. 6 the banking spacers 15'' is square in cross section as compared with the rounded configuration of the previous forms of the invention.

In other respects this form of the invention is similar to that previously shown and like reference numerals identify like parts in each of the several views.

Figure 8:
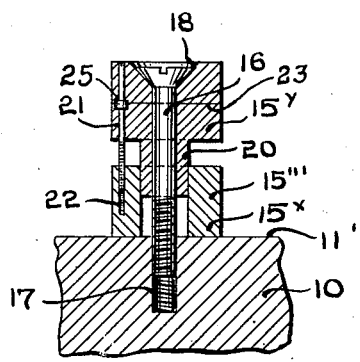
Fig. 8 is an enlarged vertical sectional view of the banking spacer shown in Fig. 7.
Figure 7:
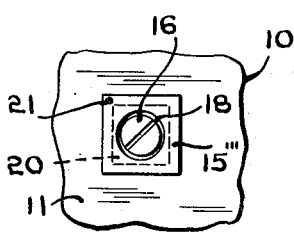
Fig. 7 is a plan view of the banking spacer constructed in accordance with still another modification of the invention.
Figure 9:
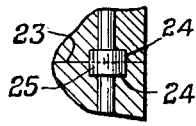
Fig. 9 is an enlarged detail view of a portion of Fig. 8.

In the modification of the invention disclosed in Fig. 7 to 9 the banking spacer 15''' consists of a base section 15x and a top section 15y. The top section 15y is formed with a depending portion 20 which slidably extends into the base section 15x for connecting the sections.

Means is provided for retaining the telescopically engaged sections 15x and 15y in various adjusted positions. This means comprises a set screw 21 which is rotatively supported in the top section 15y and which has its bottom end threadedly engaged into a complementary opening 22 formed in the base section 15x. In a loosened condition of the screw 16, the set screw 21 is adapted to be rotated in one direction or the other for extending or retracting the top section 15y with relation to the bottom section 15x.

The rotative mounting of the set screw 21 in the top section 15y is accomplished by forming the top section of superimposed portions welded together along a line 23. The adjacent faces of the portions of the top section 15y are formed with aligned recesses 24 in which a collar 25 is rotatively disposed. The collar is secured to the set screw 21 after the free end thereof has been passed through the top portion of the top section 15y and then the bottom portion of the top section is slipped over the free end of the set screw 21 and the top and bottom portions are secured together to form an integral unit thereof. Thus, the set screw 21 is rotative in the top section 15y but is not axially slidable relative thereto.

In other respects this form of the invention is similar to that previously shown and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a universal chuck having a flat face across which the jaws of the chuck move, a plurality of banking spacers removably mounted on said flat face for engaging against the face of and supporting a piece of work gripped by said jaws, each of said banking spacers being formed of a base section seated on the flat face of the chuck and a top section telescopically engaged with said base section, and a set screw rotatively supported in said top section and threadedly engaging said base section for holding said top section in various adjusted positions relative to said base section.

2. The combination with a lathe chuck of an attachment therefor comprising a base section and a top section having a projection telescopically fitted in the base section, a screw extending through the top and base sections and threaded into the chuck, and a set screw threaded into the base section and rotatively but nonslidably extended through the top section to hold the two sections in desired telescopically adjusted positions.

3. The combination with a lathe chuck of an attachment therefor comprising a base section and a top section having a projection telescopically fitted in the base section, a screw extending through the top and base sections and threaded into the chuck, and a set screw threaded into the base section and rotatively but nonslidably extended through the top section to hold the two sections in desired telescopically adjusted positions, said top section being formed of superimposed portions having their adjacent faces secured together, said portions being formed with aligned recesses arranged concentric with said set screw, and a collar mounted on said set screw and rotatively disposed in said aligned recesses forming the rotative connection of said set screw with said top section.

GILDO CAPELLAZZI.

REFERENCES CITED

The following references are of record in the file of this patent:

UNITED STATES PATENTS

| Number | Name | Date |
| --- | --- | --- |
| 1,802,655 | Kavle | Apr. 28, 1931 |
| 2,291,687 | Brobst | Aug. 4, 1942 |